(12) United States Patent
Payne et al.

(10) Patent No.: US 6,244,631 B1
(45) Date of Patent: Jun. 12, 2001

(54) HIGH EFFICIENCY DRILL PIPE

(76) Inventors: Michael Payne, 815 Parkwood Ct., McKinney, TX (US) 75070; Jackie E. Smith, 3023 Shadowdale, Houston, TX (US) 77043; Edmond I. Bailey, 13002 Walnut Lake Rd., Houston, TX (US) 72065

( * ) Notice: Subject to any disclaimer, the term of this patent is extended or adjusted under 35 U.S.C. 154(b) by 0 days.

(21) Appl. No.: 09/260,250

(22) Filed: Mar. 2, 1999

(51) Int. Cl.$^7$ ................................. F16L 25/00
(52) U.S. Cl. .................... 285/333; 285/390; 285/355
(58) Field of Search .................... 285/333, 334, 285/355, 390; 403/343; 175/320

(56) References Cited

U.S. PATENT DOCUMENTS

| | | | |
|---|---|---|---|
| 3,508,771 | * 4/1970 | Duret | 285/355 |
| 3,822,902 | * 7/1974 | Maurer et al. | 285/94 |
| 4,192,533 | * 3/1980 | Blose | 285/334 |
| 4,538,840 | * 9/1985 | DeLange | 285/333 |
| 4,591,195 | * 5/1986 | Chelette et al. | 285/332.3 |
| 4,955,644 | * 9/1990 | Pfeiffer et al. | 285/333 |
| 5,505,502 | * 4/1996 | Smith et al. | 285/334 |
| 5,826,921 | * 10/1998 | Woolley | 285/334 |
| 5,908,212 | * 6/1999 | Smith et al. | 285/333 |
| 6,010,163 | * 1/2000 | Cerruti | 285/333 |

OTHER PUBLICATIONS

British Steel Corporation Tubes Division, VAM Catalogue 850, pp. 16–17, 1986.*

World Oil's 1986 Tubing Tables, Gulf Publishing Co.*

Petroleum and natural gas industries—Steel pipes for use as drill pipe—Specification, ISO 11961, 1996.*

M.L. Payne et al: "Purpose–Built Drillpipe for Extended Reach Drilling", IADC/SPE Drilling Conf., 39313, Mar. 3–6, 1998, pp. 221–229.

* cited by examiner

*Primary Examiner*—Teri Pham Luu
(74) *Attorney, Agent, or Firm*—Browning Bushman

(57) ABSTRACT

A drill pipe 10 comprises an elongate pipe section 12 having a substantially uniform pipe outer diameter 18 and a substantially uniform pipe inner diameter 20. A pin tool joint 14 is welded at one end to the pipe section, and a box tool joint 16 is welded to the other end of the pipe section. Each of the pin and box tool joints includes a thread for mating engagement and preferably first and second shoulders. The drill pipe has a ratio, R, which takes into consideration the pipe inner diameter, $P_{ID}$, the pipe outer diameter, $P_{OD}$, the tool joint inner diameter, $TJ_{ID}$, and the tool joint outer diameter, $TJ_{OD}$. This ratio may be expressed as:

$$R = \frac{(P_{ID} + TJ_{ID})}{(TJ_{OD} - P_{OD})}.$$

According to the present invention, this ratio is greater than 8.0, and is preferably from 8.1 to 8.5, thereby providing a drill pipe with desired strength and fluid flow capabilities.

20 Claims, 1 Drawing Sheet

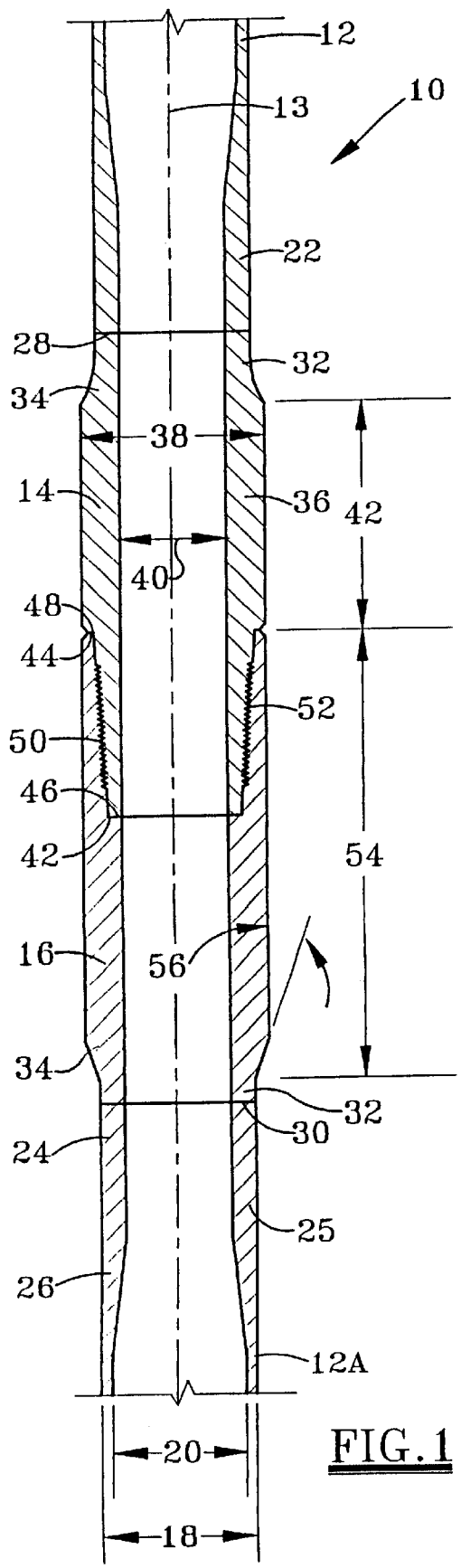
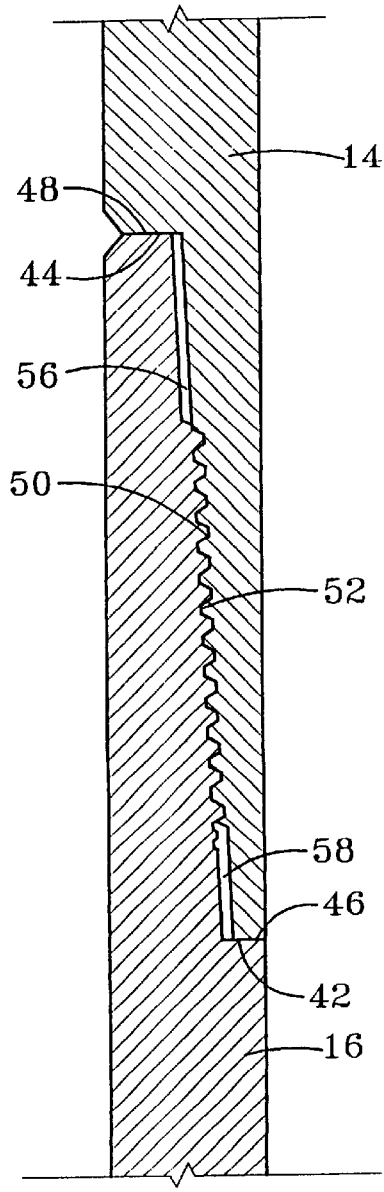
FIG.1
FIG.2

HIGH EFFICIENCY DRILL PIPE

FIELD OF THE INVENTION

The present invention relates to oilfield drill pipe of the type commonly used to drill an oil or gas well. More particularly, this invention relates to an improved drill pipe having a pipe section, a pin tool joint and a box tool joint configured for providing high fluid flow rates and high strength, while also providing high drilling efficiency and relatively low cost.

BACKGROUND OF THE INVENTION

Various prior art articles and papers discuss drill pipe design considerations. Those familiar with the design, manufacture and use of drill pipe recognize that a selected drill pipe design is based upon numerous factors, including casing/hole considerations, predicted well loads, and hydraulic requirements. The manufacture of drill pipe also takes into consideration metallurgy, high-torque tool joints, and top drive matching strength.

Although the existing drill pipe is available in various standard sizes, it frequently does not meet all the objectives of the driller. The deficiencies of existing drill pipe are particularly acute when the driller is engaged in extended reach drilling (ERD). A standard 5-inch drill pipe is generally considered inadequate for most ERD applications due to hydraulic and torsional limitations. In most applications, ERD projects utilize either or both 5½-inch and 6⅝-inch drill pipe, which is commercially available in standard sizes from various companies.

One of the significant deficiencies of 5½-inch drill pipe is its hydraulic limitations, particularly when drilling deep wells. An exemplary 5½-inch drill pipe string provides the ability to sustain 787 kips in tension and from 33 ft-kips to 45 ft-kips or more in torsion, depending on the tool joint selection. While a 5½-inch drill pipe string is generally able to sustain the desired drilling torque and tensile loads, this size drill string commonly provides a very high pressure drop at conventional flow rates. Commonly from 900 to 1100 gpm is required to effectively clean a 12¼ inch hole at high inclinations, and practical experience has shown that undesirable pressure losses are experienced when drilling under these conditions. A 5½-inch drill pipe is thus inadequate for many ERD applications and has substantial hydraulic limitations in other applications, particularly when used in long hole sections.

An alternative available to the driller is to utilize the next commercially available size of drill pipe, namely 6⅝-inch drill pipe, to reduce hydraulic pressure losses at the elevated flow rates required for effective hole cleaning. The problem is that a 6⅝-inch drill pipe represents an over-design from the viewpoint of drill loads, is inefficient from a space standpoint, and can limit setback capability. Moreover, 6⅝-inch drill pipe may require rig modifications for implementation compared to using 5½-inch drill pipe, and 6⅝-inch drill pipe cannot be used inside 9⅝-inch casing or 8½-inch open hole. The 6⅝-inch drill pipe thus overcomes most of the hydraulic limitations of a 5½ drill pipe, but is over-designed structurally, is dimensionally inefficient, may not be used after 9⅝-inch casing is set, and requires a variety of associated upgrades.

The disadvantages of the prior art are overcome by the present invention, and an improved drill pipe is hereinafter disclosed that has enhanced strength and fluid flow characteristics and in many applications will not have the disadvantages of either 5½-inch or 6⅝-inch drill pipe.

SUMMARY OF THE INVENTION

The present invention provides a reliable and cost-efficient drill pipe with high strength and good fluid flow characteristics to optimize drilling for various applications, including ERD projects. A drill pipe according to the present invention includes an elongate pipe section, a pin tool joint, and a box tool joint. The pipe section has a central axis and a substantially uniform pipe outer diameter and a substantially uniform pipe inner diameter along substantially its entire length. A pin tool joint may be affixed by welding to an axial end of the pipe section and has external pin threads and at least one pin shoulder. A box tool joint is provided at the opposing axial end of a pipe section and has internal threads for mating engagement with the external threads of a mating drill pipe and at least one box shoulder for engagement with the pin shoulder of the mating drill pipe. The pin tool joint and the box tool joint each has a substantially uniform tool joint outer diameter along its axial length and a substantially uniform tool joint inner diameter along its axial length. The drill pipe has a ratio, R, that may expressed as:

$$R = \frac{(P_{ID} + TJ_{ID})}{(TJ_{OD} - P_{OD})}$$

According to the present invention, R is greater than or equal to 8.0, and preferably is less than or equal to 8.8.

In a preferred embodiment of the invention, the pipe section outer diameter is from 5¾ inches to 6 inches, and the tool joint outer diameter is less than or equal 7 inches. The tool joint inside diameter is greater than or equal to 4 inches, and is preferably less than or equal to 4¼ inches. The pin tool joint internal thread and the box tool joint external thread are preferably each tapered. As previously noted, both the pin tool joint and the box tool joint may each be welded to the pipe section. In the preferred embodiment, a second pin shoulder is provided on the pin tool joint, and a second box shoulder is provided on the box tool joint. These first and second shoulders mate to form a body double shoulder tool joint connection.

It is an object of the present invention to provide an improved drill pipe with enhanced strength and fluid flow capability. More particularly, it is an object of the invention to provide a drill pipe consisting of an elongate pipe section, a pin tool joint, a box tool joint, with a ratio having a numerator being the sum of the pipe section ID and the tool joint ID and the denominator being the difference between the tool joint OD and the pipe section OD. This ratio, R, is greater than 8.0, and preferably is from 8.1 to 8.5.

It is a feature of the present invention that the improved drill pipe has significantly improved fluid flow characteristics compared to conventional 5½-inch drill pipe, but does not have the deficiencies of 6⅝-inch drill pipe.

Yet another feature of the present invention is that the improved drill pipe may be reliably used for extended reach drilling (ERD) operations.

It is a feature of the present invention that the drill pipe includes a pipe section having an outer diameter of from 5¾ inches to 6 inches, and that the tool joint have an outer diameter of less than or equal to 7 inches.

Another feature of the invention is that the tool joint inner diameter is from 4 inches to 4¼ inches.

It is an advantage of the present invention that the drill pipe may utilize a pin tool joint and a box tool joint that have previously been commercially used in prior art drill pipe.

These and further objects, features, and advantages of the present invention will become apparent from the following detailed description, wherein reference is made to the figures in the accompanying drawings.

BRIEF DESCRIPTION OF THE DRAWINGS

FIG. 1 is a cross-sectional view of a lower end of a drill pipe, illustrating a portion of a pipe section and a pin tool joint secured to the pipe section, a box tool joint in mating engagement with the pin tool joint, and the box tool joint secured to an upper end of an adjoining pipe section; and FIG. 2 is a detailed cross-sectional view illustrating the threaded connection shown in FIG. 1.

DETAILED DESCRIPTION OF THE PREFERRED EMBODIMENTS

The strength of the drill pipe is frequently recognized as an initial consideration when planning a well drilling operation. Drill pipe design is affected by many factors, including metallurgy, use of high-torque tool joints, and measures to match drill pipe torsional strength with the top drive capability. High-strength drill pipe allows increased flow capabilities and improved dimensional efficiencies since grades up to 165 ksi are available. Compared with conventional grade tool joints with 120 ksi yield strength, 165 ksi tool joints offers a 38% increase in tool joint torque and tension capabilities. 165 ksi drill pipe tool joints have not been widely accepted in many applications, however, due to initial implementation and technical problems. Because of strict metallurgical requirements, failures with 165 ksi drill pipe tool joints have occurred and practical application of these grades has been limited. Recent metallurgical advances now make these high strength grades more reliable, and test joints using these revised generation metallurgies have now been successfully field tested.

High-torque tool joints utilizing double shoulder or wedge threads are also now available from various commercial sources. These tool joints offer two or more torque shoulders in the same dimensional space that API tool joints provide a single torque shoulder, and thus provide higher strength and dimensional efficiency.

Although the torque loads that can be reliably transmitted through the drill pipe and the drag on the drill pipe are important issues for drilling operations, these constraints frequently are the governing design constraints, particularly when drilling extended reach drilling (ERD). In many applications, hydraulic limitations attributable to the drill pipe as discussed below are more restrictive.

Although the technology thus exists for designing drill pipe with high load capabilities, conventional drill pipe still suffers from significant limitations in hydraulics. A properly designed pipe section of a drill pipe should provide specific torsional and tensile strengths with a maximized internal diameter for a given outer diameter. Simultaneously optimizing the strength and flow characteristics of the pipe section and the tool joints is quite complicated. The pipe section ideally should have a reduced weight compared to conventional drill pipe with less hydraulic pressure loss. More efficient hydraulics for the drill pipe improves hole cleaning, while the reduced weight reduces torque and drag. An improved drill pipe may significantly enhance drilling efficiency.

In addition to strength and hydraulic limitations, the drilling operational efficiency should be a significant factor when designing drill pipe. The space constraints on an offshore platform may create a significant logistics problem when using, for example, a standard 6⅝-inch drill pipe. This larger drill string requires more space in the derrick and increases the platform loading at the time when loads from running casing would be at their highest level, and also may require that the 6⅝-inch drill pipe be laid down and off loaded while a string of smaller diameter drill pipe is picked up. This operation could thus result in significant downtime, and also introduce substantial risks of weather-related delays.

When designing a drill pipe, the special measures should be used to match drill pipe performance with anticipated top drive capability to ensure adequate drill pipe structural capability. High-torque top drive systems are useful only if the drill string provides matching strength. If the top drive capability exceeds the torsional strength of the drill pipe, the drill pipe is at risk for twist-off failures when torques erratically increase or develop a significant dynamic character. Although special measures may be used to alleviate the reduced torsional capability of a drill string compared to the top drive, such special measures can be avoided if the drill string strength matches or exceeds that of the top drive system. Accordingly, a properly designed drill string can avoid stress balancing and the use of high-friction thread compounds if the torsional capacity of the drill string is designed to exceed that of the top drive system.

In accordance with the present invention, key drill pipe design objectives and constraints were initially established for the drill pipe. At least five parameters were considered for optimizing the dimensions for the drill pipe:

1. Tool Joint OD

It was decided to limit the maximum tool joint outer diameter, $TJ_{OD}$, to 7 inches in order to facilitate overshot fishing of the drill pipe inside 9⅝-inch casing and 8½-inch open hole. If the annulus around the tool joint becomes too small, fishing of the drill pipe is not practical, and milling will be required. Limiting the tool joint outer diameter also affects the hydraulics of fluid returning to the surface in the well annulus. Also, an increase of the tool joint over 7 inches when placed in a 9⅝-inch casing or an 8½-inch open hole also increases the likelihood of packoffs and results in hole instability.

2. Tool Joint Torsional Strength

In order to accommodate high-torque top drives in a low gear, the tool joint torsional strength should allow makeup torques of approximately 45,000 ft-lbs or more. Makeup torque in this range allows the drill pipe to be matched to high-torque top drives, and insures that the drill pipe will be sufficiently robust for almost all applications. As a practical matter, providing this high torsional strength means that the tool joint will be based upon a proprietary high-torque design. Double shoulder threaded connections for the tool joints may be obtained utilizing conventional technology.

3. High Collapse Resistance

Improved drill pipe should provide a collapse resistance of approximately 8,000 psi or more in order to provide a reasonable shut-in pressure. This collapse resistance under tension load corresponds to the drill pipe being held in tension at the surface with an high annular shut-in pressure during well control operations. Providing a collapse resistance of approximately 8,000 psi requires a minimum wall thickness for the pipe section used. This wall thickness dictates both the pipe section weight as well as the hydraulic efficiency for a given pipe OD size. Although 8,000 psi is a fairly high shut in pressure, many ERD wells will benefit from this design constraint.

4. Tool Joint Bearing Stress

The elevator bearing stress on the tool joint ideally should be limited to 100 ksi at 500 tons maximum load. This drill pipe handling constraint was developed in conjunction with elevator manufacturers, and is important to provide high reliability and reduced downtime. As a practical matter, limiting elevator bearing stress on the tool joint restricts the maximum OD of the pipe to 5¹⁵⁄₁₆ inches in view of the 7-inch $TJ_{OD}$. Although 5¾-inch, 5⅞-inch, and 5¹⁵⁄₁₆-inch sizes would thus be feasible within this constraint, as the pipe OD increases with the tool joint OD held at 7 inches, the area resting on the elevator inherently becomes smaller and stress thus increases. A pipe section OD of either 5¾ inches or 5¹⁵⁄₁₆ inches is thus preferred.

5. String Weight

The drill pipe should allow 20,000-ft. TVD string weight plus 400,000 lbs. of overpull tension. These constraints relate to the drill pipe's torque and tensile capabilities, as well as drill pipe handling requirements.

Within the above constraints, the objective was to maximize both the drill pipe OD and ID in order to optimize the hydraulic carrying capability of the string, thereby providing the highest flow rates at the lowest pressure loss. Provided that these design constraints can be met, strength levels ideally should be kept as conventional as possible in order to reduce cost and enhance reliability. A key finding from the above analysis is that even with robust drill pipe tension and torsional requirements, the hydraulic efficiency of the drill pipe is governed by the collapse pressure assumed at the surface during well control operations.

The 7-inch OD tool joint according to this invention may be axially slightly longer than a standard tool joint, and the bore will ideally be from 4 to 4½ inches. The internal upset at the ends of each pipe section ideally will be smooth, with a stress concentration of less than 1.0 compared to the stress of the outside of the pipe section. Existing tool joints for 5½-inch drill pipe have a 7-inch OD and a 4-inch ID, thereby allowing the improved drill pipe to be manufactured without requiring a new tool joint designs and gauging.

The design of the improved drill pipe thus should take into consideration the geometry of both the pipe section and the tool joints, particularly as that geometry relates to the hydraulic efficiency and feasibility of the drill pipe; the tensile, torsional, and buckling strength of the drill pipe; and the drill pipe cost. The ability of the drill pipe to transmit large drilling fluid flow rates at low fluid pressures is vital for effective bottom hole cleaning, lateral hole cleaning, and reduced rig horsepower requirements. The pressure loss through the drill pipe is a primary reason that drillers currently utilize 6⅝-inch drill pipe to obtain reduced pressure loss, even though that drill pipe has significant disadvantages compared to 5½-inch drill pipe, as discussed above.

The tensile strength of the drill pipe is a function of the diameter squared, while torsional strength and buckling are functions of the diameter to the fourth power. Torsional strength and buckling strength are particularly important in horizontal drilling applications, since significant lengths of the drill strength may lie on the bottom of the hole. The drill pipe must have sufficient torsional strength to rotate the drill string and the bit. The drilling rate inherently depends on the bit pressing against the formation. Low pipe buckling strength results in limited bit weight, fatigued drill pipe, and possibly lock-up. Accordingly, 5⅞-inch drill pipe clearly has a significant advantage over 5½-inch drill pipe in this area.

According to the present invention, both the OD and ID of both the pipe sections and the tool joints are selected to optimize performance characteristics and handling procedures for the drill pipe. Both the pipe sections and the tool joints should provide minimum restrictions to drilling fluid flow coming out of the hole. The tool joint bore and the drill pipe section bore should be as large as possible to limit restriction of drilling fluid to the bit. The tool joint outer diameter must be sufficiently greater than the pipe section outer diameter to provide adequate elevator contact surface, and the tool joint strength should be matched to the pipe section strength.

The present invention has developed a drill pipe geometric performance ratio, R, which provides an indication of geometric properties of the drill pipe. This drill pipe geometric performance ratio may be defined as follows:

$$R = \frac{P_{ID} + TJ_{ID}}{TJ_{OD} - P_{OD}}$$

The numerator of this ratio, $P_{ID}+TJ_{ID}$, is an expression of the drill pipe factors that influence pressure loss, which in turn is a function of flow rate, cross-sectional area, and the transition properties between a tool joint and a pipe section. Since the tool joint ID is conventionally less than the pipe section ID, the ends of the pipe section are upset so that the wall thickness at the ends of the pipe section match the wall thickness at the end of each tool joint for an efficient welding operation. The pressure loss in the transition areas is thus a function of the difference in the diameter between the tool joint ID and the pipe section ID.

The pipe section of a drill pipe is commonly between 29 and 30 feet in axial length, while the mated pin and box tool joints are approximately two feet in axial length. Nevertheless, the numerator of the above ratio is a reasonable estimate of the factors influencing pressure loss in the drill pipe since the tool joint, while axially representing a small proportion of the overall length of the drill pipe, has a restricted ID compared to the ID of the pipe section. The internal diameter of the tool joint thus represents a significant factor affecting the overall pressure loss of fluid passing through the drill pipe. It is thus desirable for the numerator of this ratio to be as large as possible. As discussed above, the factors which limit the pipe ID and the tool joint ID are the strength requirements for the pipe section and the tool joints. A 5⅞-inch pipe section OD may be used with various wall thickness. A large ID for both the tool joint and the pipe is thus desired, providing that these components are sufficiently strong structurally for the drilling operation. The tool joints preferably have a double shoulder tool joint connection.

The denominator of this ratio, $TJ_{OD}$ less $P_{OD}$, quantifies the factors that influence pressure loss in the annulus and also the pipe strength. While the tool joints have a short axial length compared to the pipe section length, the pressure loss in the annulus attributable to the tool joint may be 10% or more of the total pressure loss in the annulus. As explained above, the tool joint OD is a limiting factor since there must be enough clearance between the tool joint and the wall of the hole to get a fishing tool over the top of the tool joint. The difference between the tool joint OD and the pipe OD is also a limiting factor since this difference provides the elevator contact when lifting the drill string. The larger the pipe OD, the greater the annular velocity of the fluid for a given flow rate. High annular velocity for the fluid allows for better hole cleaning. Also, the larger the pipe OD, the greater the torsional strength and buckling strength of the pipe section.

While the largest ID for both the pipe section and the tool joints is desirable, the largest pipe section OD with the minimum difference between the tool joint OD and the pipe section OD also has positive benefits. As a practical matter, it has been determined that the enhanced drill pipe of the present invention should have an R value that is greater than 8.0, and preferably is from 8.0 to 8.8. The following table list various values of a drill pipe according to the present invention, and also provides the R value for each drill pipe.

| $P_{OD}$ | $P_{ID}$ | $TJ_{OD}$ | $TJ_{ID}$ | R |
|---|---|---|---|---|
| 5.875 | 5.233 | 7 | 4 | 8.207 |
| 5.875 | 5.151 | 7 | 4 | 8.134 |
| 5.875 | 5.045 | 7 | 4 | 8.040 |
| 5.875 | 5.233 | 7 | 4.25 | 8.429 |
| 5.875 | 5.151 | 7 | 4.25 | 8.356 |
| 5.875 | 5.045 | 7 | 4.25 | 8.262 |

It may be seen that the R value for each of the drill pipes listed above is greater than 8.0. The calculated R value for 5½-inch drill pipe with conventionally available wall thicknesses varies from about 3.9 to 6.3. The calculated R value for 6⅝-inch drill pipe having a tool joint OD of 8½ inches and a tool joint ID of 4¼ inches is approximately 5.4. The calculated R value for 6⅝ drill pipe with an 8 inch tool joint OD and a 5 inch tool joint ID is slightly less than 8.0.

With reference now to FIG. 1, the lower end of a representative drill pipe 10 according to the present invention is depicted. The drill pipe 10 comprises an elongate pipe section 12 that has a central axis 13. Only the lower end of the pipe section 12 is depicted, since those skilled in the art will appreciate that the pipe section 12 has a substantially uniform outer diameter 18 and a substantially uniform inner diameter 20 along substantially its axial length, which typically is between 29 and 30 feet. A pin tool joint 14 is fixedly secured to the lower end of the drill pipe 12 and is shown in mated engagement with a box tool joint 16 fixedly secured to the upper end of the lower drill pipe 12A. Those skilled in the art will appreciate that the drill pipe 10 consists of an elongate tubular section 12, a pin tool joint 14 at one axial end thereof, and a box tool joint 16 at the opposing axial end thereof. Lengths of drill pipe are threaded together to form a drill pipe string, with the pin tool joint of one drill pipe mating with the box tool joint of an adjoining drill pipe. Both the drill pipe 12 and 12A are identical in construction, and thus FIG. 1 effectively depicts a drill pipe section 12 with a pin tool joint at one end and a box tool joint at an opposing end.

The pipe section 12 has a substantially uniform outer diameter, $P_{OD}$, along substantially its entire axial length, and is represented by the designation 18 in FIG. 1. Pipe section 12 also has an internal diameter, $P_{ID}$, along substantially its entire axial length, and is represented by the numeral 20 in FIG. 1. The extreme end of the pipe section 12 has a relatively short internal upset 22 at one end thereof, while the opposing end of the pipe section 12 has a similar internal upset 24. Each upset 22, 24 has a relatively thick wall portion 25 that is significantly greater than the wall thickness defined by the difference between the diameters 18 and 20, and a tapered portion 26 that is tapered to gradually interconnect the normal pipe section wall thickness with the upset thickness. As shown in FIG. 1, each end of the pipe section 12 thus has an upset wall thickness that generally matches the wall thickness of the adjoining end of the tool joint. Each end of the pipe section 12 may be fixedly connected to a respective tool joint 14, 16 by a friction weld 28, 30.

The pin tool joint 14 of the drill pipe 10 has an end portion 32 with a wall thickness sized for engagement with the internally upset end 22 of the pipe section 12. A transition portion 34 is provided to increase the diameter of the tool joint 14 to the uniform diameter 38 of the main body 36. The main tool joint body 36 of the pin tool joint 14 thus has an outer diameter, $TJ_{OD}$, which is depicted as 38 in FIG. 1, and has a tool joint inner diameter, $TJ_{ID}$, which is depicted by the numeral 40 in FIG. 1. The pin tool joint 14 thus has a substantially uniform outer diameter 38 along the axial length 42, which typically is from 8 to 12 inches, and is preferably about 10 inches.

The box tool joint 16 has a similar end portion 32 and a transition portion 34. As shown in FIG. 1, the angle 56 of the taper on the transition portion 34 conventionally is approximately 18°. The box tool joint 16 has a tool joint inner diameter that matches the inner diameter 40 of the pin tool joint, since a substantially uniform diameter bore through the mated pin and box tool joints is desired. The outer diameter of the tool joint 16 also matches the outer diameter 38 of the pin tool joint since again a uniform outer diameter of the mated tool joint is desired. The box tool joint 16 thus has a uniform diameter along the axial length 54 as shown in FIG. 1, which typically is from 12 to 18 inches, and ideally is about 15 inches. The axial length of the uniform outer diameter 38 of the mated tool joint 14, 16 is thus approximately 25 inches, which is a sufficient axial length for receiving conventional power and backup tongs commonly used in makeup and breakout operations.

As shown in FIG. 1, the drill pipe thus has a pipe section outer diameter 18 and a pipe section inner diameter 20 along substantially its entire axial length. The outer diameter of the mated tool joints 14, 16 is the diameter 38 shown in FIG. 1, and these mated tool joints have a tool joint inner diameter that is shown as 40 in FIG. 1. The end of each drill pipe section 12 is internally upset, and the upset end preferably has an internal diameter that matches the tool joint inner diameter 40, then transitions to the conventional internal diameter 20 of the pipe section 12. Those skilled in the art will appreciate that the tool joints 14, 16 may be friction welded to the ends of a drill pipe section 12 utilizing conventional welding techniques, and that a boring operation may be used to form the desired internal diameter 40 through each tool joint and the adjoining end of the internally upset pipe section 12.

With reference to FIGS. 1 and 2, the pin tool joint 14 includes external threads 50, while the box tool joint 16 includes internal threads 52 that mate with the threads 50. Threads 50 and 52 are preferably tapered threads, as shown in FIG. 2. The pin and box tool joints may also provide a double-shoulder connection. An end shoulder 42 on the pin tool joint 14 is thus shown in FIG. 2 in engagement with a box shoulder 46 on the box tool joint 16. Another end shoulder 48 on the box tool joint 16 is also in mating engagement with the shoulder 44 on the pin tool joint 14. Accordingly, an annular radially external shoulder formed by the mating surfaces 44 and 48 and an annular radially internal shoulder formed by the surfaces 46 and 48 provide the desired double shoulder connection. The noze end of the box tool joint 16 may be configured to provide a slight annular gap 56 as shown in FIG. 2, while a similar gap 58 is provided at the noze end of the pin tool joint. A suitable threaded connection for the drill pipe in accordance with the present invention may be the commercially available Grant Prideco double shoulder XT Series connection. Further information with respect to this connection is disclosed in pending U.S. patent application Ser. No. 08/850,658, filed May 2, 1997, and is hereby incorporated by reference. Further information with respect to the various factors affecting the drill pipe design according to the present invention, particularly for ERD applications, is disclosed in the paper entitled "Purpose-Built Drillpipe for Extended Reach Drilling," SPE 39319.

As explained above, each pin tool joint and box tool joint preferably is welded to the end of a pipe section, although alternatively a threaded connection between the tool joints and the pipe section is possible. Although preferably the pin and box tool joints each have an inner diameter and an outer diameter at an end that matches that of the adjoining end of the pipe section, variations in these diameters are possible, provided that a reliable interconnection is made. As indicated above, the mated tool joints preferably include a double shoulder connection, although less preferably a single shoulder tool joint connection is possible.

Various additional modifications to the drill pipe disclosed herein should be apparent from the above description of the preferred embodiments. Although the invention has thus been described in detail for these embodiments, it should be understood that this explanation is for illustration only and that the invention is not limited to the described embodiments. Alternative components and operating techniques should be apparent to those skilled in the art in view of this disclosure. Modifications are thus contemplated and may be made without departing from the spirit of the invention, which is defined by the following claims.

What is claimed is:

1. A drill pipe with enhanced strength and fluid flow capability, the drill pipe comprising:
   an elongate pipe section having a central axis, a substantially uniform pipe outer diameter, $P_{OD}$, along its axial length, and a substantially uniform pipe inner diameter, $P_{ID}$, along its axial length;
   a pin tool joint at an axial end of the pipe section, the pin tool joint having external pin threads and a pin shoulder;
   a box tool joint at an axial end of the pipe section opposing the pin tool joint, the box tool joint having internal box threads for mating engagement with the external pin threads of a mating drill pipe and a box shoulder for engagement with the pin shoulder of the mating drill pipe;
   the pin tool joint and the box tool joint each having a substantially uniform tool joint outer diameter, $TJ_{OD}$, along its axial length and a substantially uniform tool joint inner diameter, $TJ_{ID}$, along its axially length; and
   the drill pipe having a ratio, R, expressed as:

$$8.8 \geq \frac{P_{ID} + TJ_{ID}}{TJ_{OD} - P_{OD}} \geq 8.0.$$

2. The drill pipe as defined in claim 1, wherein R is from 8.1 to 8.5.

3. The drill pipe as defined in claim 2, wherein R is from 8.2 to 8.4.

4. The drill pipe as defined in claim 1, wherein the pipe section outer diameter, $P_{OD}$, is from 5¾ inches to 6 inches.

5. The drill pipe as defined in claim 1, wherein the tool joint outer diameter, $TJ_{OD}$, is less than or equal to 7 inches.

6. The drill pipe as defined in claim 1, wherein the tool joint inner diameter, $TJ_{ID}$, is greater than or equal to 4 inches.

7. The drill pipe as defined in claim 6, wherein the tool joint inner diameter, $TJ_{ID}$, is less than or equal to 4¼ inches.

8. The drill pipe as defined in claim 1, wherein the pin tool joint internal thread and the box tool joint external thread are each tapered.

9. The drill pipe as defined in claim 1, when the pin tool joint and the box tool joint are each welded to the pipe.

10. The drill pipe as defined in claim 1, further comprising:
    another pin shoulder on the pin tool joint;
    another box shoulder on the box tool joint; and
    the another pin shoulder mates with the another box shoulder of the mating drill pipe.

11. A drill pipe with enhanced strength and fluid flow capability, the drill pipe comprising:
    an elongate pipe section having a central axis, a substantially uniform pipe outer diameter, $P_{OD}$, of from 5¾ inches to 6 inches along its axial length, and a substantially uniform pipe inner diameter, $P_{ID}$, along its axial length;
    a pin tool joint connected by welding to an axial end of the pipe section, the pin tool joint having external pin threads and a pin shoulder;
    a box tool joint connected by welding to an axial end of the pipe section opposing the pin tool joint, the box tool joint having internal box threads for mating engagement with the external pin threads of a mating drill pipe and a box shoulder for engagement with the pin shoulder of the mating drill pipe;
    the pin tool joint and the box tool joint each having a substantially uniform tool joint outer diameter, $TJ_{OD}$, less than or equal to 7 inches along its axial length and a substantially uniform tool joint inner diameter, $TJ_{ID}$, of at least 4 inches along its axially length; and
    the drill pipe having a ratio, R, expressed as:

$$8.8 \geq \frac{P_{ID} + TJ_{ID}}{TJ_{OD} - P_{OD}} \geq 8.0.$$

12. The drill pipe as defined in claim 11, wherein R is from 8.1 to 8.5.

13. The drill pipe as defined in claim 11, wherein the tool joint inner diameter, $TJ_{ID}$, is less than or equal to 4¼ inches.

14. The drill pipe as defined in claim 11, wherein the pin tool joint internal thread and the box tool joint external thread are each tapered.

15. The drill pipe as defined in claim 11, further comprising:
    another pin shoulder on the pin tool joint;
    another box shoulder on the box tool joint; and
    the another pin shoulder mates with the another box shoulder of the mating drill pipe.

16. A drill pipe with enhanced strength and fluid flow capability, the drill pipe comprising:
    an elongate pipe section having a central axis, a substantially uniform pipe outer diameter, $P_{OD}$, along its axial length, and a substantially uniform pipe inner diameter, $P_{ID}$, along its axial length;
    a pin tool joint connected by welding to an axial end of the pipe section, the pin tool joint having external pin threads and first and second axially spaced pin shoulders;
    a box tool joint connected by welding to an axial end of the pipe section opposing the pin tool joint, the box tool joint having internal box threads for mating engagement with the external pin threads of a mating drill pipe and first and second axially spaced box shoulders each for engagement with a respective pin shoulder of the mating drill pipe;

the pin tool joint and the box tool joint each having a substantially uniform tool joint outer diameter, $TJ_{OD}$, less than or equal to 7 inches along its axial length and a substantially uniform tool joint inner diameter, $TJ_{ID}$, along its axial length;

the elongate pipe section having an internal upset region at each axial end thereof, each upset region having an enhanced wall thickness and an internal upset diameter approximating the tool joint inner diameter, $TJ_{ID}$; and the drill pipe having a ratio, R, expressed as:

$$8.8 \geq \frac{P_{ID} + TJ_{ID}}{TJ_{OD} - P_{OD}} \geq 8.0.$$

17. The drill pipe as defined in claim 16, wherein R is from 8.1 to 8.5.

18. The drill pipe as defined in claim 16, wherein the pipe section outer diameter, $P_{OD}$, is from 5¾ inches to 6 inches.

19. The drill pipe as defined in claim 16, wherein the tool joint inner diameter, $TJ_{ID}$, is greater than or equal to 4 inches and is less than or equal to 4¼ inches.

20. The drill pipe as defined in claim 16, wherein the pin tool joint internal thread and the box tool joint external thread are each tapered.

* * * * *